(12) United States Patent
Zadoks et al.

(10) Patent No.: US 11,669,878 B2
(45) Date of Patent: Jun. 6, 2023

(54) SYSTEMS AND METHODS FOR USING HARDWARE TRANSMITTERS TO IMPROVE CUSTOMER SERVICE

(71) Applicant: STATE FARM MUTUAL AUTOMOBILE INSURANCE COMPANY, Bloomington, IL (US)

(72) Inventors: Alex Zadoks, Bloomington, IL (US); Connor Dieckman, Bloomington, IL (US); Stephanie Delong, Bloomington, IL (US); Nihal Shah, Bloomington, IL (US); Alex Littleton, Bloomington, IL (US); Amber Harris, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 108 days.

(21) Appl. No.: 17/237,002

(22) Filed: Apr. 21, 2021

(65) Prior Publication Data

US 2021/0241336 A1 Aug. 5, 2021

Related U.S. Application Data

(63) Continuation of application No. 15/331,376, filed on Oct. 21, 2016, now Pat. No. 11,023,940.
(Continued)

(51) Int. Cl.
*G06Q 30/00* (2023.01)
*G06Q 30/0601* (2023.01)
(Continued)

(52) U.S. Cl.
CPC ....... *G06Q 30/0613* (2013.01); *H04L 67/306* (2013.01); *H04L 67/52* (2022.05);
(Continued)

(58) Field of Classification Search
USPC ...................................................... 705/26.41
See application file for complete search history.

(56) References Cited

U.S. PATENT DOCUMENTS 9,424,598 B1 8/2016 Kraft
9,767,430 B2 9/2017 Schwartz
(Continued)

OTHER PUBLICATIONS

Dudhane, Nilima & Pitambare, Sanjeevkumar, Location Based and Contextual Services Using Bluetooth Beacons: New Way to Enhance Customer Experience, Jun. 2015, Lecture Notes on Information Theory, vol. 3, No. 1, pp. 31-33.) (Year: 2015).*

*Primary Examiner* — Jeffrey A. Smith
*Assistant Examiner* — Brittany E Bargeon
(74) *Attorney, Agent, or Firm* — Marshall, Gerstein & Borun LLP

(57) ABSTRACT

The present disclosure is directed to automatically determining customer information in response to detecting that a customer's mobile device is located at a retail location. A mobile device of the customer may detect a communication from a wireless communication beacon, and may send a customer ID to a backend server. Upon receiving the customer ID, the backend server may access customer information, and transmit it to a server of the retail location. The server may, in turn, cause a customer mobile device in the retail location to display the customer information, thus facilitating effective and efficient customer service. With the customer's permission, upon detecting the customer's mobile device, customer information may be pushed to a salesperson's device or information (e.g., insurance quote or claim information; new vehicle financing, feature, or review information; or other product or service information) may be pushed to the customer's mobile device.

18 Claims, 9 Drawing Sheets

Related U.S. Application Data

(60) Provisional application No. 62/247,388, filed on Oct. 28, 2015.

(51) Int. Cl.
    *H04L 67/306* (2022.01)
    *H04W 4/02* (2018.01)
    *H04W 4/06* (2009.01)
    *H04W 4/80* (2018.01)
    *H04L 67/52* (2022.01)

(52) U.S. Cl.
    CPC ............... *H04W 4/02* (2013.01); *H04W 4/06* (2013.01); *H04W 4/80* (2018.02)

(56) References Cited

U.S. PATENT DOCUMENTS

| | | |
|---|---|---|
| 10,163,148 B1 | 12/2018 | Chatterjee et al. |
| 11,023,940 B1* | 6/2021 | Zadoks ................ H04W 4/021 |
| 2006/0149638 A1 | 7/2006 | Allen |
| 2011/0231285 A1 | 9/2011 | Englund et al. |
| 2013/0085792 A1 | 4/2013 | Klein |
| 2014/0156459 A1* | 6/2014 | Zises .................. G06Q 30/0643 705/26.61 |
| 2014/0207614 A1 | 7/2014 | Ramaswamy et al. |
| 2015/0026010 A1* | 1/2015 | Ellison ............... G06Q 30/0641 705/26.41 |
| 2015/0052013 A1 | 2/2015 | Anttonen et al. |
| 2016/0055499 A1* | 2/2016 | Hawkins ............ G06Q 30/0204 705/7.33 |
| 2016/0103904 A1 | 4/2016 | Greenberg et al. |
| 2016/0150363 A1 | 5/2016 | Hughes et al. |
| 2016/0171472 A1* | 6/2016 | Pugh .................... G06Q 20/322 705/17 |
| 2016/0171486 A1* | 6/2016 | Wagner ................ G06Q 20/326 705/39 |
| 2016/0300217 A1 | 10/2016 | Grabovski et al. |
| 2017/0053330 A1 | 2/2017 | Smith et al. |

* cited by examiner

SYSTEMS AND METHODS FOR USING HARDWARE TRANSMITTERS TO IMPROVE CUSTOMER SERVICE

CROSS-REFERENCE TO RELATED APPLICATIONS

This application is a continuation of U.S. patent application Ser. No. 15/331,376 (filed Oct. 21, 2016 and entitled "SYSTEMS AND METHODS FOR USING HARDWARE TRANSMITTERS TO IMPROVE CUSTOMER SERVICE"), which claims benefit of the filing date of U.S. Provisional Patent Application No. 62/247,388 (filed Oct. 28, 2015 and entitled "SYSTEMS AND METHODS FOR USING HARDWARE TRANSMITTERS TO IMPROVE CUSTOMER SERVICE");—which are hereby incorporated by reference in their entireties.

FIELD OF THE DISCLOSURE

The present disclosure generally relates to systems and methods for using hardware transmitters within a retail environment to improve customer server. More particularly, the present disclosure is directed to systems and methods for retrieving information relevant to a customer in response to detecting a presence of the customer via a hardware transmitter.

BACKGROUND

Numerous businesses benefit from their customers visiting a retail store or location, as the customer visits may be a vital contribution to increased revenue and customer retention. This is especially the case for businesses that emphasize personalized customer service, such as for insurance agents and their customers, department or "big box" stores, and other similar businesses. However, employees, representatives, or agents of these businesses must rely on their memories or on manually accessing company records to identify customers who may enter the retail locations.

SUMMARY

The present embodiments may, inter alia, facilitate the communication of various customer information. For instance, the present embodiments may automatically and dynamically determine when a customer is located within or otherwise on the premises of a retail store, branch, or other type of business. An electronic device of the customer may detect a signal that is broadcast by a hardware transmitter located within the business. The electronic device may communicate an identification of the customer to a backend server which may retrieve a set of information associated with the customer. The backend server may send the set of information to an in-store server or otherwise an electronic device accessible by an employee, representative, or agent of the business. The electronic device may initiate an application and display the set of information in an interface of the application. As a result, the employee, representative, or agent may effectively and efficiently review the set of information to assist in serving the customer.

In one aspect, a computer-implemented method of facilitating a set of actions with a server within a place of business using a network connection may be provided. The server may implement a customer information application and at least one hardware transmitter may be disposed within the place of business. The method may include, with the customer's permission or affirmative consent, receiving, at a backend server from an electronic device, an identification of a customer, the electronic device sending the identification of the customer in response to detecting the at least one hardware transmitter; accessing, by the bank end server from a database using the identification of the customer, a set of information associated with the customer; and/or transmitting, via the network connection, the set of information to the server within the place of business, the server within the place of business transmitting the set of information to a computing machine within the place of business to cause the computing machine to display the set of information within the customer information application. As a result, an online or other type of customer experience may be enhanced.

In another aspect, a system for communicating relevant information associated with customers within a place of business may be provided. The system may include a hardware transmitter installed within the place of business and detectable by an electronic device of a customer, and a computing device comprising a transceiver configured to communicate with a backend server, a display device configured to display content, and a processor interfaced with the transceiver and the display device. The processor may be configured to, with the customer's permission or affirmative consent, receive, from the backend server via the transceiver, a set of information associated with the customer, the set of information retrieved by the backend server based upon an identification of the customer sent to the backend server by the electronic device in response to the electronic device detecting the hardware transmitter, and cause the display device to display the set of information. As a result, an online or other type of customer experience may be enhanced.

In a further aspect, a computer-implemented method of communicating relevant information associated with customers within a place of business may be provided. The method may include, with customer permission or affirmative consent, broadcasting, by a hardware transmitter via a short range communication, a signal detectable by an electronic device, the electronic device configured to send an identification of a customer to a backend server in response to detecting the signal. The method may further include receiving, from the backend server via a network connection, a set of information associated with the customer, the set of information retrieved by the backend server based upon the identification of the customer sent to the backend server by the electronic device in response to the electronic device detecting the hardware transmitter, and displaying, on a display device, the set of information. As a result, an online or other type of customer experience may be enhanced.

DETAILED DESCRIPTION

Figure 1:
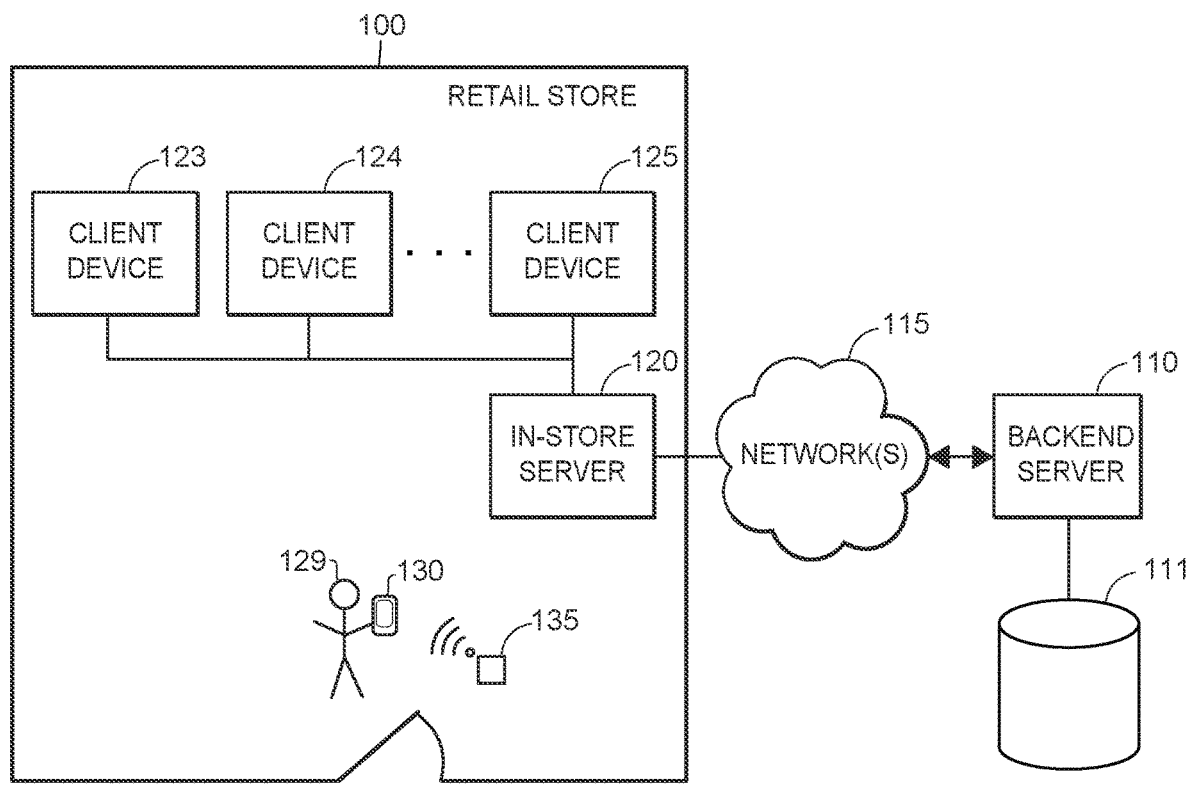
FIG. 1 depicts an exemplary diagram of a retail location and related components, in accordance with some embodiments.

The present embodiments may relate to, inter alia, installing beacon technology in insurance agent's offices, allowing for client's smartphones or mobile devices to connect to the beacon and send a notification to the agent with the client's name and current insurance policies. Notifications may also be sent to a policy holder's phone or mobile device about payments, coverages, or coupons that are relevant to their lives. These notifications may also be pushed at car dealerships, where a mobile device application ("App") may push a quote to policy holders that are searching for a new car.

As one example, with the customer's permission or affirmative consent, upon detecting that a customer's mobile device is located at, or in the vicinity of, a retail location, customer information may be pushed to a salesperson's device to facilitate customer service. Additionally or alternatively, after the detection of the customer's mobile device, information (e.g., insurance quote or claim information; new vehicle financing, feature, or review information; or other product or service information) may be pushed to the customer's mobile device for the customers' review and consideration.

More generally, the systems and methods discussed herein generally may relate to automating certain in-store or on-business-site functionalities associated with customer service. According to certain aspects, a retail store or generally a property associated with a business may, with customer permission or affirmative consent, be able to detect the moment when a customer (or customer mobile device) enters the retail store or a certain portion or section of the retail store, automatically access information associated with the customer stored in a database, and dynamically display on a computer screen, to an employee, representative, or agent of the business in real-time, the information associated with the customer.

In some embodiments, the retail store associated with the business may have a set of hardware transmitters installed therein, wherein the set of hardware transmitters may be configured to transmit information to any electronic devices (such as mobile devices) within range of the set of hardware transmitters. For example, a hardware transmitter may be placed near the entrance of the retail store, or in other locations or sections of the retail store. The electronic or mobile devices may belong to customers of the business, and may each have a unique identification or otherwise store an identification associated with the customer.

When a mobile device (or other electronic or computing device) detects a signal broadcast by a hardware transmitter, the mobile device may transmit its identification (or an identification of the corresponding customer), with the customer's permission, to a backend server which stores a set of information associated with customers of the business. The backend server may use the identification sent from the mobile device, with the customer's permission, to access information associated with the corresponding customer, and send the information to a server or otherwise a mobile or electronic device located in the retail store. After receiving the information, the server in the retail store may cause a display device (e.g., a monitor) within the retail store to display the information associated with the customer. In this regard, employees, representatives, or agents of the business may review the information concurrently with or prior to meeting with or greeting the customers.

The systems and methods therefore offer numerous benefits. In particular, customers of a business may feel more welcome and may generally receive better service when the business representatives are able to provide a more welcoming greeting and service that is personally tailored to the customers. Further, the businesses themselves may realize the benefits of better customer service, namely attracting customers, greater customer retention, higher sales, and the like. It should be appreciated that other benefits are envisioned.

The systems and methods discussed herein address a business challenge (customer attraction and retention) that is particular to the Internet. In particular, the challenge relates to a difficulty in effectively providing service to customers when agents of the businesses do not know or remember customers. This is particularly apparent as businesses gain more customers who are increasingly anonymous. In conventional environments, a business owner or representative must know or otherwise recognize a customer in order to provide personalized service subsequent to the customer entering the business. In contrast, the systems and methods not only automatically detect a customer (or customer mobile device) entering a business, but the systems and methods may also automatically retrieve information associated with the customer and present the information to a relevant business owner or representative. Therefore, because the systems and methods employ the automatic detection of devices, and the automatic collection and display of relevant information associated with a customer (with customer permission), the systems and methods are necessarily rooted in computer technology in order to overcome the noted shortcomings.

Similarly, the systems and methods provide improvements in a technical field, namely, automatic data retrieval. Instead of the systems and methods merely being performed by hardware components using basic functions, the systems and methods employ complex steps that go beyond the mere concept of simply retrieving and combining data using a computer. In particular, the hardware components are numerous: hardware transmitters, electronic devices, a backend server, a server within the retail store, and a set of computer devices within the retail store. Further, the electronic devices detect the hardware transmitters via short range communications and communicate with the backend server, which communicates with the server within the retail store to cause the server to communicate with the set of computer devices. This combination of elements further impose meaningful limits in that the operations are applied to improve automatic data retrieval by detecting devices and communicating data among multiple electronic devices in a meaningful and effective way.

According to implementations, the systems and methods may support a dynamic, real-time or near-real-time retrieval and analysis of any relevant data. In particular, the electronic or mobile device may detect a signal broadcast by a hardware transmitter (or communication beacon, such as an iBeacon by Apple or another communication beacon that employs Bluetooth communication techniques), and may dynamically and automatically send one or more appropriate identifications to the backend server. Upon receipt of the identification, the backend server may dynamically and automatically retrieve information associated with a user of the electronic or mobile device, and may dynamically and automatically send the information to the in-store server. Upon receipt of the information, the in-store server may dynamically and automatically cause an in-store computer to display the information for access and review by a representative/employee of the business/store. In this regard, the representative/employee is afforded the benefit of being able to access and review the information in real-time or near-real-time in response to the user entering the business/store.

I. Exemplary Environment and Components for Facilitating Communication of Customer Information FIG. 1 illustrates an exemplary layout of an example retail location 100. According to some embodiments, the retail location 100 may be associated with a company or business, where the retail location 100 may be a "brick and mortar" location that may include one or more physical buildings or structures, and may accommodate shoppers and/or customers. It should be appreciated that various types of the retail location 100 are envisioned. For example, the retail location 100 may be an office for an insurance agent, where the customers may be insurance policyholders who purchase and maintain the policies through the insurance agent. For further example, the retail location 100 may be a high-end clothing boutique that emphasizes and benefits from personalized customer service, or a vehicle dealership offering new vehicles to customers.

The retail location 100 may include or support various hardware components that may be located within the retail location 100. As illustrated in FIG. 1, the retail location 100 may include an in-store server 120 that may connect to a set of client devices 123, 124, 125, such as via any type of wired or wireless network. For example, the set of client devices 123-125 may connect to the in-store server 120 via one or more wired or wireless local area networks (LAN/WLAN), or other network(s). According to some embodiments, each of the set of client devices 123-125 may be any type of electronic or mobile device such as a desktop computer, a notebook computer, a mobile phone, a Personal Digital Assistant (PDA), a smart phone, a tablet computer, a multimedia player, an MP3 or MP4 player, a digital or analog broadcast receiver, a remote controller, smart glasses, wearable electronics, or any other electronic apparatus, including those capable of RF (Radio Frequency) wireless communication or data transmission.

Although FIG. 1 depicts three (3) client devices 123-125, it should be appreciated that fewer or additional client devices are envisioned. Further, although the in-store server 120 is described and depicted to be within the retail location 100, it should be appreciated that the in-store server 120 may be located exterior to, or even offsite from, the retail location 100, in which case the in-store server 120 may connect to the client devices 123-125 using any type of data communication via any standard or technology (e.g., GSM, CDMA, TDMA, WCDMA, LTE, EDGE, OFDM, GPRS, EV-DO, UWB, IEEE 802 including Ethernet, WiMAX, Wi-Fi, Bluetooth, and/or others).

The in-store server 120 may store various information associated with the retail location 100, such as information associated with any customers of the business or company and/or with the business or company itself. The client devices 123-125 may each support various computer-executable applications that may be associated with the business or company. For example, each of the client devices 123-125 may support a client information application that may be configured to retrieve and display information associated with customers of the business or company, among other functionalities. For example, if the business is an insurance office, the client information application may be configured to access and display information associated with customer insurance policies. In one implementation, the in-store server 120 may store the applications that are remotely accessible by the client devices 123-125, such as in a thin-client environment.

The in-store server 120 may be configured to communicate with a backend server 110 via one or more networks 115. According to some embodiments, the network(s) 115 may be any suitable wireless communication protocol network, such as the Internet or a wireless telephony network (e.g., GSM, CDMA, TDMA, WCDMA, LTE, EDGE, OFDM, GPRS, EV-DO, UWB, IEEE 802 including Ethernet, WiMAX, Wi-Fi, and/or others), or another type of network. The backend server 110 may be configured to connect to and communication with additional retail locations (not shown in FIG. 1). The backend server 110 may further interface with a database 111 or other type of memory configured to store information associated with the retail location 100 and any additional retail locations. For example, if the retail locations represent insurance offices, the database 111 may store various information associated with customer insurance policies.

A customer 129 (or generally a user or individual) may enter the retail location 100, browse in the various departments or sections, and/or converse or meet with individuals associated with the retail location 100 (e.g., an insurance agent, or vehicle salesman). The customer 129 may be equipped with an electronic or mobile device 130 which may be any type of portable electronic device, for example, a notebook computer, a mobile phone, a Personal Digital Assistant (PDA), a smart phone, a tablet computer, a multimedia player, an MP3 or MP4 player, smart glasses, wearable electronics, a digital or analog broadcast receiver, a remote controller, or any other electronic apparatus. The electronic or mobile device 130 may be configured for communication via one or more types of communication networks, such as any of the local, personal, or wide area networks, or communication beacons, mentioned herein. Further, the electronic or mobile device 130 may support a set of applications for execution thereon, where one of the applications may be an application associated with the business or company. For example, if the customer 129 is an insurance policyholder, the application may be an application offered by an associated insurance company, where the application may access and display at least some information with the policy or policies owned by the customer 129.

According to some embodiments, the retail location 100 may support various wireless networks (e.g., a local area network (WLAN) and a personal area network (WPAN)) to which the electronic device 130 may connect. Further, the retail location 100 may be configured with a hardware transmitter 135 or "beacon", or "communication beacon," such as an iBeacon or other beacon capable of wireless communication and/or capable of using Bluetooth communication techniques.

Although FIG. 1 depicts the retail location 100 supporting one (1) transmitter or communication beacon 135, it should be appreciated that the retail location 100 may support additional transmitters. The transmitter or beacon 135 may be disposed in various locations of the retail location 100 (e.g., near an entrance of the retail location 100). The transmitter or beacon 135 may also be secured to various components of the retail location 100 (e.g., shelves, ceiling, etc.). The transmitter or beacon 135 may include any combination of hardware and software components, including a module for transmitting or broadcasting signals. Further, the transmitter or beacon 135 may be configured to be powered by a battery or via another power source.

According to some embodiments, the transmitter or beacon 135 may support one or more short-range communication protocols such as radio-frequency identification (RFID), Bluetooth®, Bluetooth® low energy (BLE), Infrared Data Association (IrDA), near field communication (NFC), Zig-Bee, other protocols defined under the IEEE 802 standard, and/or other technologies. The transmitter or beacon 135 may also be configured to broadcast or transmit a signal that may include any stored data. In one embodiment, the transmitter 135 may continuously broadcast a signal that may include a unique identifier of the transmitter or beacon 135 (e.g., "TRANS 123").

The signal that the transmitter or beacon 135 broadcasts may have an associated detection range depending on the type of communication protocol. Generally, Bluetooth® signals have a range of 100 meters and BLE signals have a range of 50 meters. The detection range of the signal that the transmitter or beacon 135 broadcasts may also vary and may be programmable. For example, the range of a signal that is broadcast by the transmitter or beacon 135 may be fifteen (15) meters.

When the electronic or mobile device 130 is within broadcast range of the transmitter or beacon 135, the electronic or mobile device 130 may detect and receive the signal. In particular, a communication module of the electronic or mobile device 130 that supports a short range communication protocol (e.g., a BLE chip) may detect and receive the signal. For example, if the transmitter or beacon 135 is located at an entrance of the retail store 100, the electronic or mobile device 130 may detect the signal from the transmitter or beacon 135 upon the customer 129 (and the electronic or mobile device 130) entering the retail store 100. According to some embodiments, the electronic or mobile device 130 (and any application executing thereon) may facilitate various functionalities in response to detecting certain connections within the retail location 100.

Although the client devices 123-125 and the in-store server 120 are depicted as separate components in FIG. 1, a single device may include both the in-store server 120 and one of the client devices 123-125. In particular, the single device may directly communication with the backend server 110 via the network(s) 115, and display relevant information via a user interface or display device. For example, the client device 123 may be a smart phone with communication and display capabilities, as well as a processor to facilitate the functionalities discussed herein.

Figure 2:
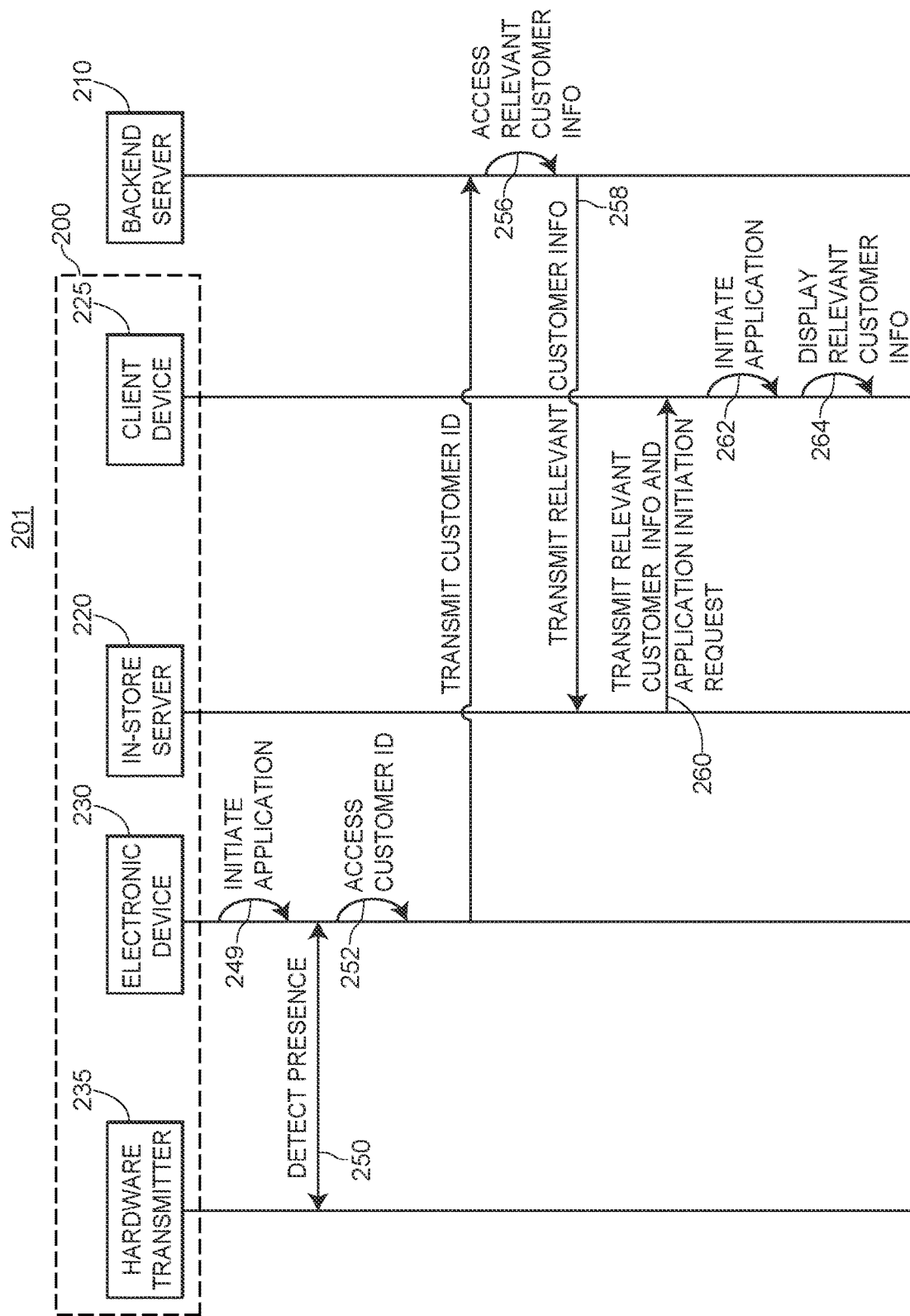
FIG. 2 depicts an exemplary signal diagram associated with facilitating various types of customer service, in accordance with some embodiments.

II. Exemplary Communication Flows for Facilitating the Communication of Customer Information FIG. 2 depicts an exemplary signal diagram 201 associated with facilitating certain functionalities within a retail location 200 (such as the retail location 100 as described with respect to FIG. 1). In particular, the signal diagram 201 depicts facilitating the display of information associated with a customer when a customer is detected within the retail location 200. The signal diagram 201 may include a hardware transmitter 235 (such as the hardware transmitter or communication beacon 135 as discussed with respect to FIG. 1), an electronic device 230 (such as the electronic or mobile device 130 as discussed with respect to FIG. 1), an in-store server 220 (such as the in-store server 120 as discussed with respect to FIG. 1), a client device 225 (such as the client device 125 as discussed with respect to FIG. 1), and a backend server 210 (such as the backend server 110 as discussed with respect to FIG. 1). In one implementation, the in-store server 220 and the client device 225 may be combined into a single component or device.

The signal diagram 210 may begin with the electronic or mobile device 230 initiating (249) an application stored thereon, where the application may be associated with the retail location 200. In one implementation, the customer may manually initiate the application on the electronic device 230. In another implementation, the electronic device 230 may automatically initiate the application, such as if the electronic device 230 detects (e.g., via GPS coordinates) that it is within proximity to the retail location 200.

The electronic device may also detect (250) a presence of the transmitter 235. In particular, the electronic device 230 may receive, via a short range communication (e.g., Bluetooth®), a signal that is transmitted by the transmitter 235, where the signal may include an identification of the transmitter 235.

In one embodiment, the application of the electronic device 230 may receive and examine the signal from the transmitter 235, such as an application that is associated with the retail location 200 or a business or company related thereto. The application may be currently executing on the electronic device 230, either in the foreground or background. In one implementation, the electronic device 230 may detect the presence of the transmitter 235 without executing the application, such as via an operating system of the electronic device 230.

The application of the electronic device 230 may access (252) a customer identification (ID) in response to the electronic device 230 detecting the transmitter 235. According to some embodiments, the customer ID may uniquely identify a user of the electronic device 230 (i.e., a customer of the retail location 200), where the customer ID may be assigned to the customer by the business or company (or assigned according to other techniques or conventions). The electronic device 230 may transmit (254) the customer ID to the backend server 210 via a network connection, such as a cellular or Internet connection. In some implementations, the electronic device 230 may transmit the customer ID via a WLAN connection within the retail location 200, where the in-store server 220 may forward the customer ID to the backend server 210. Further, the electronic device 230 may also transmit the identification of the transmitter 235 to the backend server 210.

After receiving the customer ID (and optionally the identification of the transmitter 235, or a communication beacon), the backend server 210 may access (256) relevant information associated with the customer using the customer ID. According to some embodiments, the backend server 210 may store certain information associated with the customer such as, for example, a name of the customer, an address of the customer, a digital image of the customer (e.g., a headshot), details related to any insurance policies or accounts of the customer (including details related to insured assets of the customer), dates of past visits to the retail location 200, a purchase history of the customer, and/or other information associated with the customer and/or with customer accounts. In operation, to access the customer information, the backend server 210 may query a database using the customer ID received from the electronic device 230.

In some implementations, the backend server 210 may access certain information based upon the identification of the transmitter 235, or communication beacon. For example, the backend server 210 may determine that the transmitter 235 is located near an entrance to the retail location 200, and may access a name of the customer for purposes of enabling an individual at the retail location 200 to greet the customer by name. For further example, if the retail location 200 is a department store, the backend server 210 may determine that the transmitter 235 is located near a particular section of the department store (e.g., a menswear department), and the backend server 210 may access a purchase history for the customer in that particular section.

The backend server 210 may transmit (258) the customer information to the in-store server 220 via a network connection. After receiving the customer information, the in-store server 220 may re-transmit (260) the customer information along with an application initiation request to the client device 225. According to some embodiments, the application initiation request may be a request to initiate a particular application that may be installed on or accessible by the client device 225, for example a customer information application. In some implementations, the in-store server 220 may send just the customer information without the request to initiate the particular application (e.g., such as if the client device 225 is already executing the particular application).

After receiving the customer information, the client device 225 may initiate (262) the application, such as the customer information application. In some implementations, the client device 225 may be already executing the application when the customer information is received. The client device 225 may display, via a user interface using the application, the received customer information. In this regard, an individual associated with the business or company (e.g., an insurance agent, a sales associated, etc.) may use the client device 225 to interface with the application, view the customer information, make various selections, modify or update any data or information, and/or facilitate other functionalities. For example, an insurance agent may easily and effectively view the name and policy information of a customer shortly after the customer enters the agent's office. Accordingly, the insurance agent may be able to offer improved customer service and the customer may have a better impression of the visit to the agent's office, among other benefits. For further example, a sales associate may view preferences or a purchase history of a particular customer and may tailor the sales experience accordingly.

Although the embodiments described herein address situations specific to insurance agents and their customers (including providing insurance quotes and/or handling insurance claims), it should be appreciated that the systems and methods may be applied to other scenarios and environments. In particular, the systems and methods may be implemented in a business that offers various products for sale. For example, the business may be an automobile dealership, and the systems and methods may identify that a particular customer is present in the automobile dealership, and may use any stored information associated with the particular customer to generate an automobile insurance quote or vehicle financing or loan terms for the particular customer. Further, the systems and methods may leverage the identifications of any transmitters to provide specific information and/or offer specific services that may be associated with a location of a particular transmitter. For example, the backend server 210 may determine that a customer is located near a particular transmitter or communication beacon (which may be near a particular vehicle) for a certain amount of time, and may generate an insurance quote that is specific to the particular vehicle. It should be appreciated that other environments and scenarios are envisioned.

III. Exemplary Interfaces for Displaying Customer Information

Figure 4:
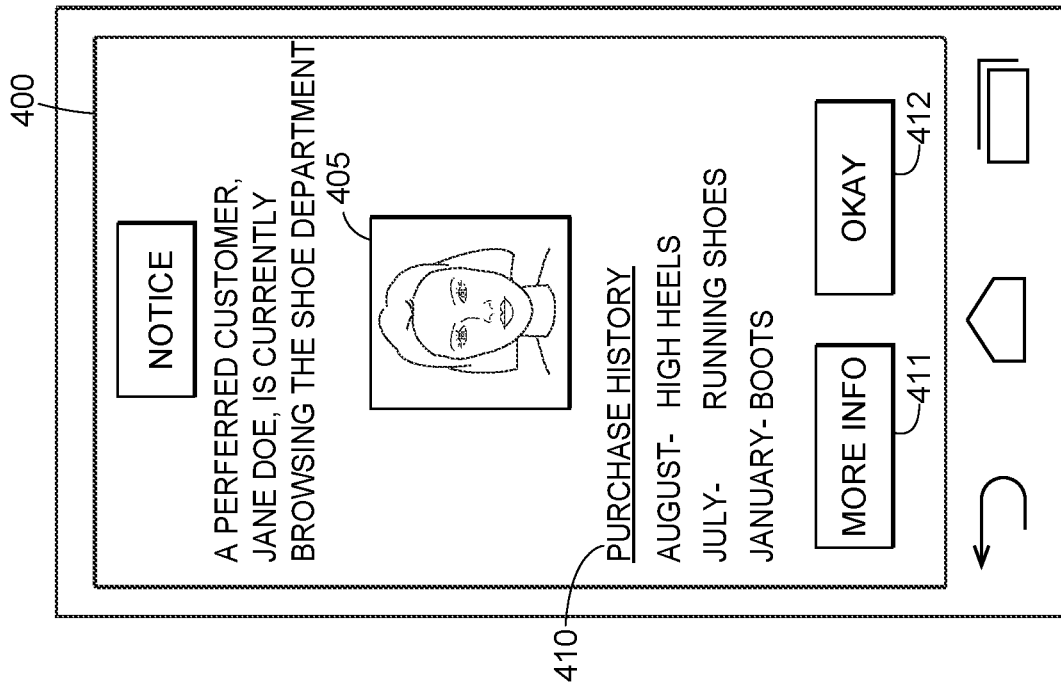
FIGS. 3 and 4 depict exemplary interfaces associated with the display of various customer information, in accordance with some embodiments.
Figure 3:
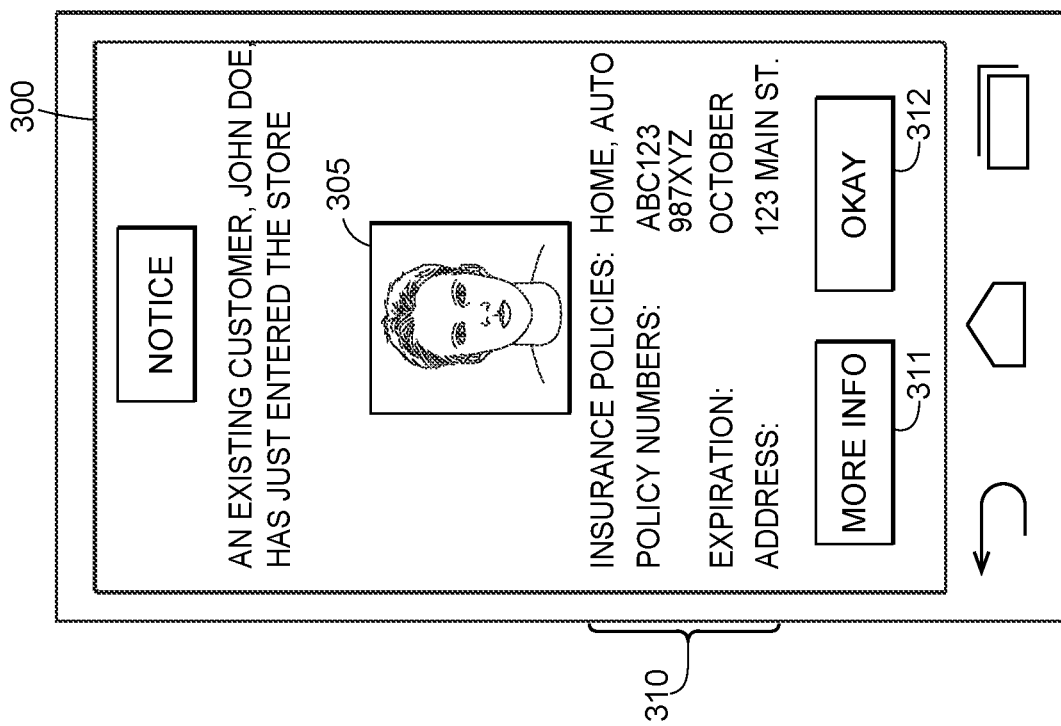

FIGS. 3 and 4 illustrate exemplary user interfaces associated with displaying information associated with a customer whose presence is detected in a retail store. An electronic or mobile device (e.g., the client device 225 as discussed with respect to FIG. 2) may be configured to display the interfaces and/or receive selections and inputs via the interfaces, where the electronic device may be associated with an owner, representative, agent, employee, or the like, of a retail store or business. For example, a dedicated application that is configured to operate on the electronic device may display the interfaces. The electronic device may display the interfaces in response to receiving the displayed information from a backend server. It should be appreciated that the interfaces are merely exemplary and that alternative or additional content is envisioned.

FIG. 3 illustrates an interface 300 that includes information associated with a customer of an insurance provider, where the customer may enter an office of an insurance agent. In particular, the interface 300 indicates that a customer "John Doe" has just entered the insurance office. The interface 300 may include an image 305 of John Doe, so that a relevant individual associated with the office may ascertain which individual within the office is John Doe. Further, the interface 300 may include a set of information 310 associated with John Doe including, as shown, types of insurance policies, policy numbers, expirations date, and an address for John Doe. The interface 300 may further include a "more info" selection 311 that enables an accessing user to select to view more information associated with John Doe, as well as an "okay" selection 312 that enables the accessing user to dismiss the interface 300.

FIG. 4 illustrates an interface 400 that includes information associated with a customer of a department store, where the customer may enter the department store. In particular, the interface 400 indicates that a customer "Jane Doe" is currently browsing the shoe department of the department store. The interface 400 may include an image 405 of Jane Doe, so that a relevant individual (e.g., a sales associate) may ascertain which individual within the shoe department is Jane Doe. Further, the interface 400 may include a set of information 410 associated with Jane Doe including, as shown, a Purchase History that details past items that Jane Doe has purchased. Accordingly, the relevant individual may effectively and efficiently ascertain the items that Jane Doe has purchased in an effort to tailor customer service for Jane Doe. The interface 400 may further include a "more info" selection 411 that enables an accessing user to select to view more information associated with Jane Doe, as well as an "okay" selection 412 that enables the accessing user to dismiss the interface 400.

IV. Exemplary Communication of Customer Information

Figure 5:
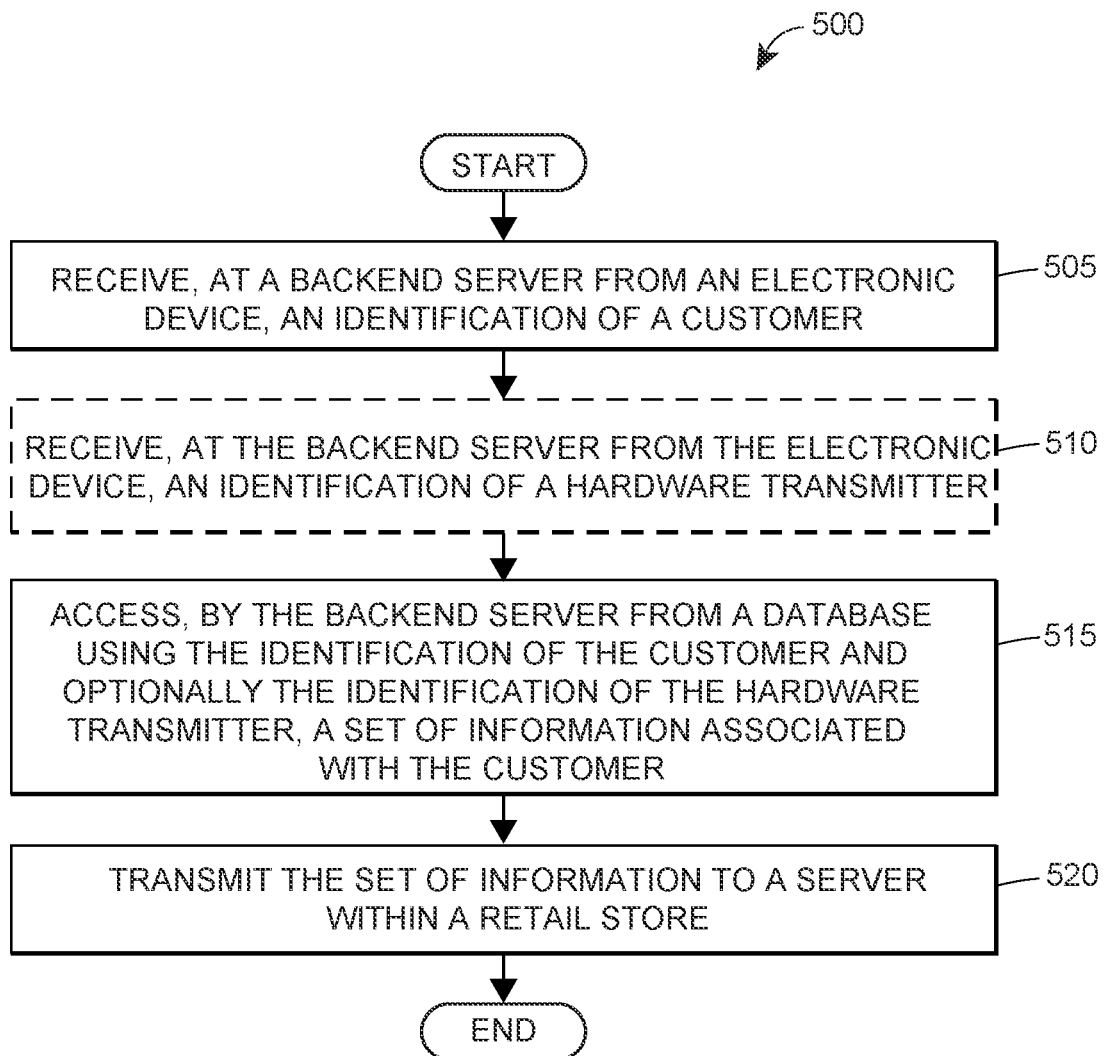
FIG. 5 depicts an exemplary flow diagram associated with facilitating a set of actions with a server within a retail store, in accordance with some embodiments.

FIG. 5 depicts a block diagram of an exemplary computer-implemented method 500 of facilitating a set of actions with a server within a retail store using a network connection. According to some embodiments, the server may implement a customer information application and a hardware transmitter may be disposed within the retail store.

The method 500 may be facilitated by a server or other electronic device, such as the backend server 210 as discussed with respect to FIG. 2.

The method 500 may begin when the server receives (block 505), from an electronic device (e.g., a mobile device), an identification of a customer. In some embodiments, the electronic device may send the identification of the customer in response to detecting the hardware transmitter. The server may optionally receive (block 510), from the electronic device, an identification of the hardware transmitter. In some embodiments, the hardware transmitter may broadcast its identification in a signal that is detectable by the electronic device.

The server may access (block 515), from a database using the identification of the customer and optionally the identification of the hardware transmitter, a set of information associated with the customer. In some embodiments, the server may access at least one of: an image of the customer, a name of the customer, an address of the customer, a data of last visit, a purchase history, and insurance policy information. In one implementation, the server may determine a location of the hardware transmitter within the retail store, and may access a purchase history of the customer corresponding to the location.

The server may transmit (block 520) the set of information to a server within a retail store. After receiving the set of information, the server within the retail store may cause a computing machine within the retail store to display the set of information within the customer information application. In some embodiments, the server within the retail store may further transmit an instruction to the computing machine to cause the computing machine to initiate the customer information application, such as if the computing machine is not currently executing the customer information application.

V. Exemplary Method Communicating Customer Information

Figure 6:
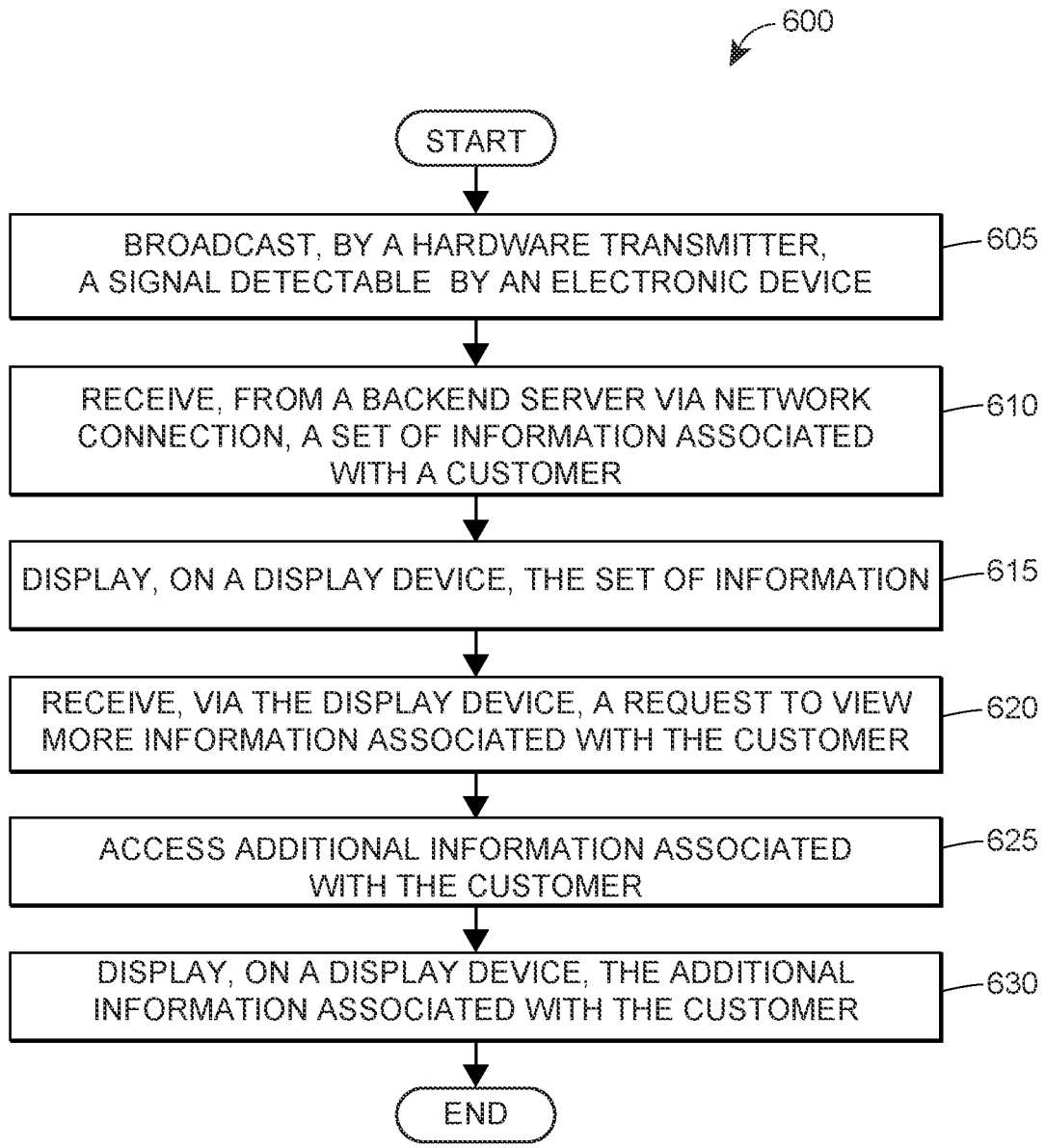
FIG. 6 depicts an exemplary flow diagram associated with communicating relevant information associated with customers within a retail store, in accordance with some embodiments.

FIG. 6 depicts a block diagram of an exemplary computer-implemented method 600 of communicating relevant information associated with customers within a retail store. The method 600 may be facilitated by various components, such as a hardware transmitter (or communication beacon) located within the retail store and an electronic device (e.g., mobile device) that may be located within the retail store. The electronic device may include an in-store server and/or a display device.

The method 600 may begin when the hardware transmitter broadcasts (block 605) a signal that is detectable by an electronic device (e.g., a smart phone of a customer). In some embodiments, the signal may include an identification of the hardware transmitter. The electronic device may receive (block 610), from a backend server via a network connection, a set of information associated with a customer. In some embodiments, the electronic device may receive at least one of: an image of the customer, a name of the customer, an address of the customer, a data of last visit, a purchase history, and/or insurance policy information. Further, in some embodiments, the set of information may be based upon a location of the hardware transmitter or beacon within the retail store.

The electronic device may display (block 615), on the display device, the set of information. In some embodiments, the electronic device may automatically initiate an application in response to receiving the set of information, where the electronic device may display the set of information within an interface associated with the application. The electronic device may receive (block 620), via the display device, a request to view more information associated with the customer. Further, the electronic device may access (block 625) additional information associated with the customer. In some embodiments, the additional information may be included as part of the original set of information. The electronic device may display (block 630), on the display device, the additional information associated with the customer.

VI. Exemplary Controller

Figure 7:
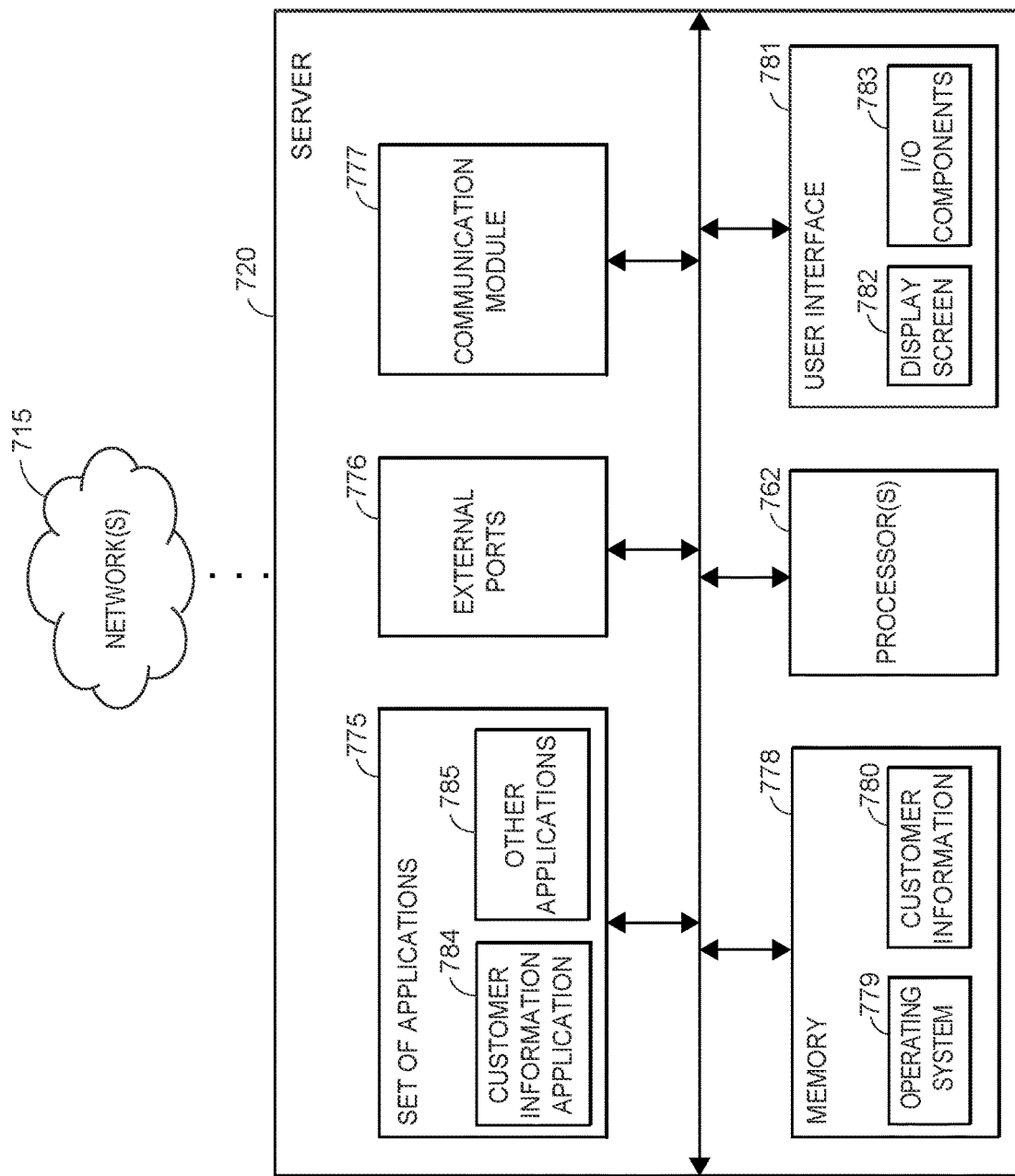
FIG. 7 is a block diagram of an exemplary server, in accordance with some embodiments.

FIG. 7 illustrates a diagram of an exemplary server 720 in which the functionalities as discussed herein may be implemented. According to some embodiments, the server 720 may be an in-store server such as the in-store server 220 as discussed with respect to FIG. 2 or the backend server 210 as discussed with respect to FIG. 2. In another embodiment, the server 720 may represent an electronic device including components that may be found in an in-store server as well as a client device (such as the in-store server 220 and the client device 225 as discussed with respect to FIG. 2).

The server 720 may include a processor 762 as well as a memory 778. The memory 778 may store an operating system 779 capable of facilitating the functionalities as described herein. The server 720 may also store a set of applications 775 (i.e., machine readable instructions). For example, the set of applications 775 may include a customer information application 784 configured to determine, access, and/or display information associated with a customer, such as a customer of a particular retail store. The set of applications 775 may further include one or more other applications 785.

The processor 762 may interface with the memory 778 to execute the operating system 779 and the set of applications 775. According to some embodiments, the memory 778 may also include a set of customer information 780. The customer information application 784 may access information from and store information to the customer information 780. The memory 778 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The server 720 may further include a communication module 777 configured to communicate data via one or more networks 715, such as via wireless communication and/or data transmission. Network(s) 715 may include both a local network for communicating between devices on, or proximate to, a certain property and a remote network for communicating between the property and external parties or components. According to some embodiments, the communication module 777 may include one or more transceivers (e.g., WWAN, WLAN, and/or WPAN transceivers) functioning in accordance with IEEE standards, 3GPP standards, or other standards, and configured to receive and transmit data via one or more external ports 776. In some embodiments, the communication module 777 may include separate transceivers configured to interact with the local and remote networks separately. The server 720 may further include a user interface 781 configured to present information to a user and/or receive inputs from the user. As shown in FIG. 7, the user interface 781 may include a display screen 782 and I/O components 783 (e.g., ports, capacitive or resistive touch sensitive input panels, keys, buttons, lights, LEDs, speakers, microphones).

According to the present embodiments, the user may access the server 720 via the user interface 781 to access or otherwise view certain customer information. In some embodiments, the server 720 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code is adapted to be executed by the processor 762 (e.g., working in connection with the operating system 779) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources. It should be appreciated that the server 720 may include additional, less, or alternate components, including those discussed elsewhere herein.

VII. Exemplary Method of Facilitating Push Notifications

Figure 8:
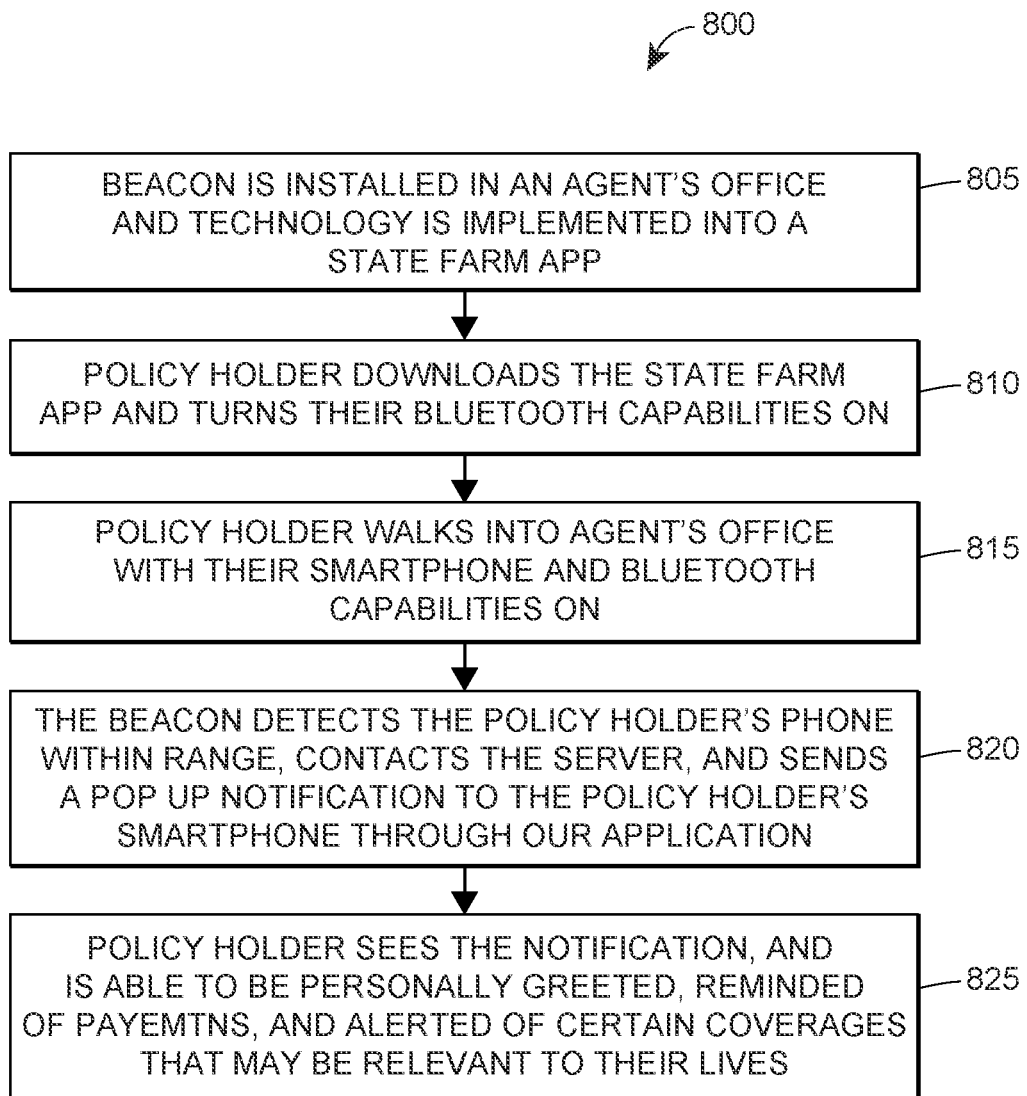
FIG. 8 depicts a flow diagram associated with an exemplary scenario of the described systems and methods, in accordance with some embodiments.

FIG. 8 depicts a block diagram of an exemplary computer-implemented method 800 of facilitating push notifications for a consumer device. The method 800 may begin when a beacon or transmitter is installed (block 805) in an agent's office and technology is implemented into a client application (e.g., an application associated with an insurance provider). A customer or policy holder may download (block 810) the client application to an electronic device and activate a short range communication capability on the electronic device, and expressly or impliedly provide consent for receiving push notifications based upon customer information and/or customer mobile device location, such as discussed herein.

The customer or policy holder may enter (block 815) the agent's office with the electronic device with short range communication capability activated. The beacon may detect (block 820) the policy holder's device, contact a server, and send a pop up notification to the device via the installed client application. The policy holder may view (block 825) the notification, and may be personally greeted by an agent, reminded of payments, and alerted of certain relevant coverages, among other benefits.

Figure 9:
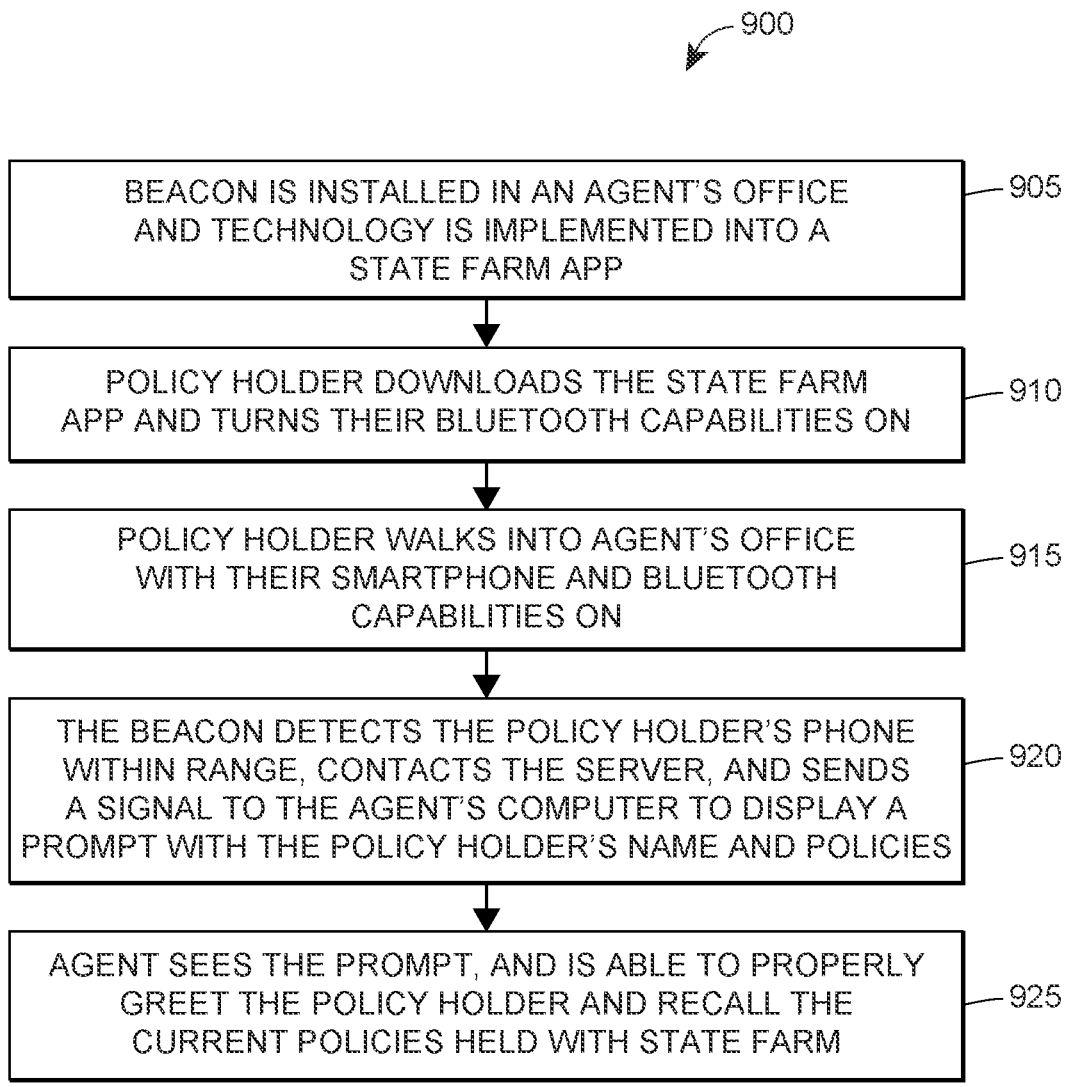
FIG. 9 depicts a flow diagram associated with an exemplary scenario of the described systems and methods, in accordance with some embodiments.

Push notifications may also be sent to an existing or potential customer's mobile device related to auto, home, life, renters, or other types of insurance. Additionally or alternatively, push notifications may be sent to an existing insurance customer's mobile device related to, or that facilitate, filing insurance claims pursuant to the customer's policy or policies. For instance, partially or wholly pre-populated virtual insurance applications (for various types of insurance), or virtual insurance claims (for various types of insurance (auto, home, life, renters, personal articles, pet, burial, etc.)) may be pushed to existing or potential customers' mobile devices. VIII. EXEMPLARY METHOD OF DETECTING CUSTOMERS FIG. 9 depicts a block diagram of an exemplary computer-implemented method 900 of detecting customers in an agent's office. The method 900 may begin with a beacon or transmitter is installed (block 905) in an agent's office and technology is implemented into a client application (e.g., an application associated with an insurance provider). A customer or policy holder may download (block 910) the client application to an electronic device and activate a short range communication capability on the electronic device.

The customer or policy holder may enter (block 915) the agent's office with the electronic device with short range communication capability activated. The beacon may detect (block 920) the policy holder's device, contact a server, and send a signal to the agent's computer to display a prompt or notification including the policy holder's name and any policy information. The agent may view (block 925) the prompt and is able to properly greet the policy holder and recall the current policies held with the insurance provider.

The agent may also activate functionality to pushes notifications to an existing or potential customer's mobile device related to auto, home, life, renters, or other types of insurance. Additionally or alternatively, push notifications may be sent to an existing insurance customer's mobile device related to, or that facilitate, filing insurance claims pursuant to the customer's policy or policies. For instance, pre-populated virtual insurance applications, or virtual insurance claims may be pushed to customers' mobile devices.

IX. Exemplary Method of Detecting Customers

Figure 10:
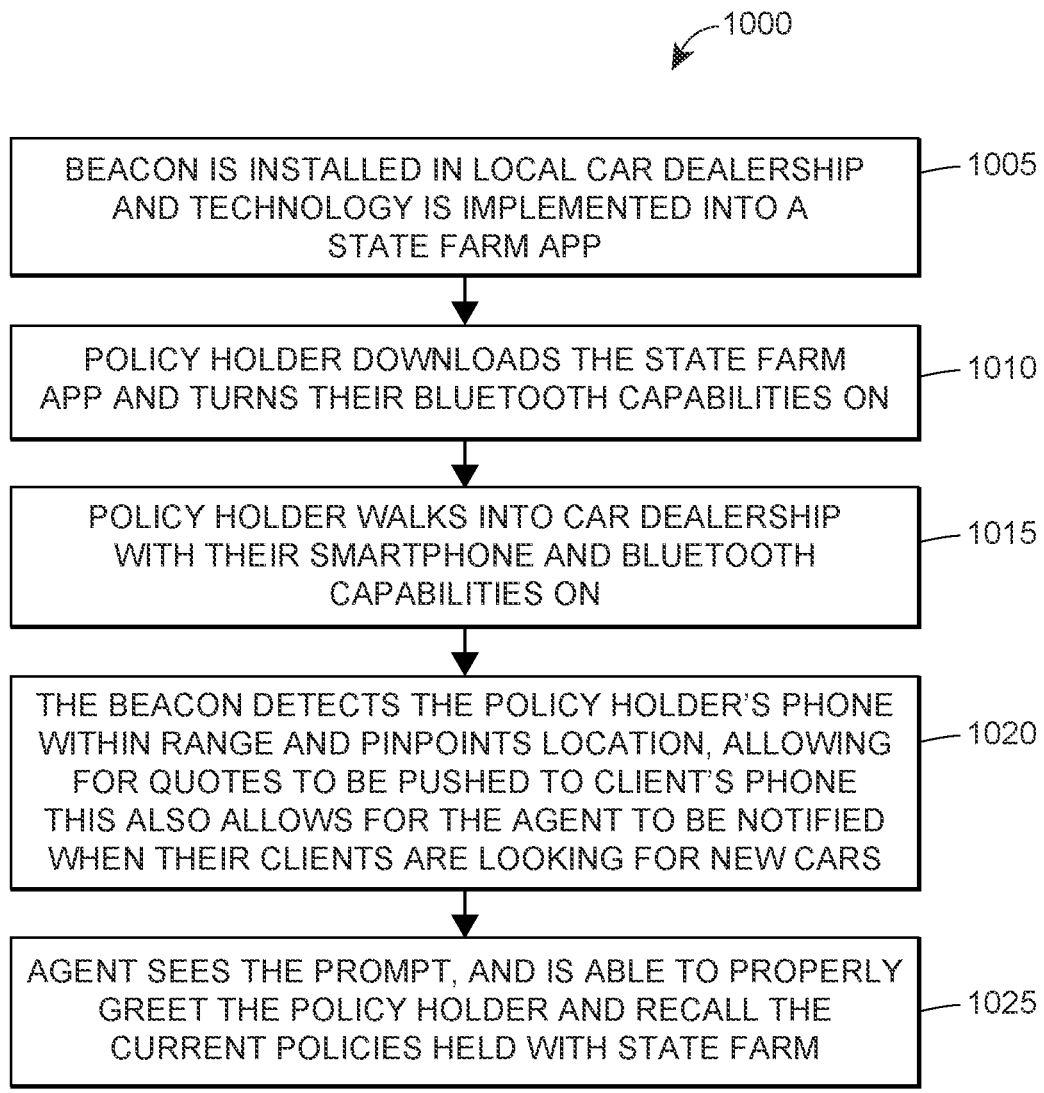
FIG. 10 depicts a flow diagram associated with an exemplary scenario of the described systems and methods, in accordance with some embodiments.

FIG. 10 depicts a block diagram of an exemplary method 1000 of detecting customers in a car dealership. The method 1000 may begin with a beacon or transmitter is installed (block 1005) in a local car dealership and technology is implemented into a client application (e.g., an application associated with an insurance provider). A customer or policy holder may download (block 1010) the client application to an electronic device and activate a short range communication capability on the electronic device.

The customer or policy holder may enter (block 1015) the car dealership with the electronic device with short range communication capability activated. The beacon may detect (block 1020) the policy holder's device within range and pinpoint the location of the device, enabling auto insurance quotes to be pushed to the device. This further allows for an agent to be notified that the policy holder may be looking for a new vehicle. The agent may view (block 1025) the prompt and is able to properly greet the policy holder and recall the current policies held with the insurance provider.

Push notifications may also be sent to an existing or potential customer's mobile device related to vehicle financing or vehicle loans, including vehicle loan terms, amounts, and interest rates. Additionally or alternatively, push notifications may be sent to an existing insurance customer's mobile device related to one or more specific types of vehicles, vehicle features, vehicle reviews, etc.

X. Exemplary Method of Facilitating a Set of Actions with A Server within a Retail Store According to one aspect, a computer-implemented method of facilitating a set of actions with a server within a retail store using a network connection may be provided. In one embodiment, the server may implement a customer information application and at least one hardware transmitter may be disposed within the retail store. The method may include receiving, at a backend server from an electronic device, an identification of a customer, the electronic device sending the identification of the customer in response to detecting the at least one hardware transmitter; accessing, by the backend server from a database using the identification of the customer, a set of information associated with the customer; and/or transmitting, via the network connection, the set of information to the server within the retail store, the server within the retail store transmitting the set of information to a computing machine within the retail store to cause the computing machine to display the set of information within the customer information application.

In one embodiment, receiving, at the backend server from the electronic device, the identification of the customer may include receiving, at the backend server from the electronic device via a wide area network connection, the identification of the customer and/or customer preferences. Further, transmitting the set of information to the server may include transmitting, via the wide area network connection, the set of information to the server.

In one additional embodiment, the server within the retail store may further transmit an instruction to the computing machine to cause the computing machine to initiate the customer information application. The method may further include receiving, at the backend server from the electronic device, an identification of the at least one hardware transmitter. Additionally, accessing the set of information associated with the customer may include accessing, using the identification of the customer and the identification of the at least one hardware transmitter, the set of information associated with the customer.

In another embodiment, accessing, using the identification of the customer and the identification of the at least one hardware transmitter, the set of information associated with the customer may include determining a location of the at least one hardware transmitter within the retail store; and accessing a purchase history of the customer corresponding to the location.

In a further embodiment, accessing the set of information associated with the customer may include accessing at least one of: an image of the customer, a name of the customer, an address of the customer, a date of last visit, a purchase history, and insurance policy information.

XI. Exemplary System for Communicating Relevant Information Associated with Customers within a Retail Store In a further aspect, a system for communicating relevant information associated with customers within a retail store may be provided. The system may include a hardware transmitter (or communication beacon) installed within the retail store and detectable by an electronic device of a customer, and a computing device comprising a transceiver configured to communicate with a backend server, a display device configured to display content, and a processor interfaced with the transceiver and the display device. The processor may be configured to receive, from the backend server via the transceiver, a set of information associated with the customer, the set of information retrieved by the backend server based upon an identification of the customer sent to the backend server by the electronic device in response to the electronic device detecting the hardware transmitter, and/or cause the display device to display the set of information.

In one embodiment, the hardware transmitter may be configured to broadcast a signal identifying the hardware transmitter via a short range communication, the signal detectable by the electronic device. The hardware transmitter may be associated with a location of the retail store, and the set of information retrieved by the backend server may be further based upon the location of the retail store.

Additionally, in an embodiment, the computer device may store an application, and the processor may be further configured to, in response to receiving the set of information, automatically initiate the application. Further, to cause the display device to display the set of information, the processor may be configured to cause the display device to display the set of information within an interface associated with the application.

According to an additional embodiment, the set of information may include at least one of: an image of the customer, a name of the customer, an address of the customer, a date of last visit, a purchase history, and/or insurance policy information.

XII. Exemplary Method of Communicating Relevant Information Associated with Customers within a Retail Store In a further aspect, a computer-implemented method of communicating relevant information associated with customers within a retail store may be provided. The method may include broadcasting, by a hardware transmitter via a short range communication, a signal detectable by an electronic device, the electronic device configured to send an identification of a customer to a backend server in response to detecting the signal. The method may further include receiving, from the backend server via a network connection, a set of information associated with the customer, the set of information retrieved by the backend server based upon the identification of the customer sent to the backend server by the electronic device in response to the electronic device detecting the hardware transmitter, and displaying, on a display device, the set of information.

In one embodiment, broadcasting the signal detectable by the electronic device may include broadcasting the signal identifying the hardware transmitter. Additionally, the hardware transmitter may be associated with a location of the retail store, and the set of information retrieved by the backend server may be further based upon the location of the retail store.

In a further embodiment, the method may further include, in response to receiving the set of information, automatically initiating an application. Additionally, displaying the set of information may include displaying the set of information within an interface associated with the application.

Displaying the set of information may include displaying at least one of: an image of the customer, a name of the customer, an address of the customer, a date of last visit, a purchase history, and/or insurance policy information. The method may further include receiving, via the display device, a request to view more information associated with the customer; accessing additional information associated with the customer; and/or displaying, on the display device, the additional information associated with the customer.

XIII. Additional Considerations

Any reference to "retail store," "property," or "place of business" is meant to be exemplary and not limiting. Any "retail store," "property," or "place of business" described herein may be a brick-and-mortar property. The systems and methods described herein may be applied to any property or structure, such as homes, offices, farms, lots, parks, apartments, condos, and/or other types of properties or buildings.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

This detailed description is to be construed as examples and does not describe every possible embodiment, as describing every possible embodiment would be impractical, if not impossible. One could implement numerous alternate embodiments, using either current technology or technology developed after the filing date of this application.

What is claimed is:

1. A computer-implemented method of interfacing with an in-store server located within a brick-and-mortar property, wherein the in-store server interfaces with a computing machine located within the brick-and-mortar property that executes a customer information application, the method comprising:
    receiving, at a backend server from an electronic device via a network connection, (i) an identification of a customer, and (ii) an identification of a hardware transmitter, the electronic device sending the identification of the customer and the identification of the hardware transmitter in response to detecting the hardware transmitter;
    accessing, by the backend server from a database using the identification of the customer, (i) a digital image depicting the customer, and (ii) information associated with an account of the customer, the account related to the brick-and-mortar property; and
    transmitting, via the network connection, the digital image depicting the customer and the information associated with the account of the customer to the in-store server, the in-store server transmitting, to the computing machine within the brick-and-mortar property, (i) the digital image depicting the customer and the information associated with the account of the customer, and (ii) a request to initiate the customer information application on the computing machine to cause the computing machine to (i) initiate the customer information application, and (ii) concurrently display the digital image depicting the customer and the information associated with the account of the customer.

2. The computer-implemented method of claim 1, wherein the network connection is a wide area network connection, and wherein receiving, at the backend server from the electronic device, the identification of the customer comprises:
    receiving, at the backend server from the electronic device via the wide area network connection, the identification of the customer;
and wherein transmitting the digital image and the information to the in-store server comprises:
    transmitting, via the wide area network connection, the digital image and the information to the in-store server.

3. The computer-implemented method of claim 1, wherein accessing the information associated with the account of the customer comprises:
    accessing at least one of: a name of the customer, an address of the customer, a date of a past visit to the brick-and-mortar property, or a purchase history of the customer.

4. The computer-implemented method of claim 1, wherein the electronic device detects the hardware transmitter via a personal area network.

5. The computer-implemented method of claim 1, wherein the hardware transmitter is installed within the brick-and-mortar property.

6. The computer-implemented method of claim 1, wherein the request to initiate the customer information application on the computing machine further causes the computing machine to display a selection for more information.

7. A system for interfacing with an in-store server located within a brick-and-mortar property, comprising:
    a computing machine located within the brick-and-mortar property and configured to execute a customer information application; and
    an in-store server comprising:
        a transceiver configured to communicate with a backend server, and
        a processor interfaced with the transceiver and configured to:
            receive, from the backend server via the transceiver, (i) a digital image depicting the customer, and (ii) information associated with an account of the customer, the account related to the brick-and-mortar property, the backend server accessing the digital image and the information associated with the account based upon an identification of the customer and an identification of a hardware transmitter being sent to the backend server by an electronic device in response to the electronic device detecting the hardware transmitter, and
            transmit, to the computing machine, (i) the digital image depicting the customer, (ii) the information associated with the account of the customer, and (iii) a request to initiate the customer information application;
    wherein the computing machine is configured to:
        receive, from the in-store server, (i) the digital image depicting the customer, (ii) the information associated with the account of the customer, and (iii) a request to initiate the customer information application,
        initiate the customer information application, and
        concurrently display, via a user interface associated with the customer information application, the digital image depicting the customer and the information associated with the account of the customer.

8. The system of claim 7, wherein the transceiver communicates with the backend server via a wide area network connection.

9. The system of claim 7, wherein the information associated with the account of the customer comprises at least one of: a name of the customer, an address of the customer, a date of a past visit to the brick-and-mortar property, or a purchase history of the customer.

10. The system of claim 7, wherein the processor further receives a purchase history for the customer in a location of the brick-and-mortar property associated with the hardware transmitter.

11. The system of claim 10, wherein the computing machine further displays, via the user interface associated with the customer information application, the purchase history for the customer.

12. The system of claim 7, wherein the computing machine further displays, via the user interface associated with the customer information application, a selection for more information.

13. A computer-implemented method of communicating relevant information associated with customers within a brick-and-mortar property, the method comprising:
- broadcasting, by a hardware transmitter via a short range communication, a signal detectable by an electronic device, the electronic device configured to send (i) an identification of a customer and (ii) an identification of the hardware transmitter to a backend server in response to detecting the signal, the backend server accessing, from a database using the identification of the customer, (i) a digital image depicting the customer, and (ii) information associated with an account of the customer, the account related to the brick-and-mortar property;
- receiving, by an in-store server from the backend server via a network connection, (i) the digital image depicting the customer, and (ii) the information associated with the account of the customer;
- transmitting, by the in-store server to a computing machine located within the brick-and-mortar property, (i) the digital image depicting the customer, (ii) the information associated with the account of the customer, and (iii) a request to initiate the customer information application;
- initiating, by the computing machine, the customer information application; and
- concurrently displaying, by the computing device via a user interface associated with the customer information application, the digital image depicting the customer and the information associated with the account of the customer.

14. The computer-implemented method of claim 13, wherein receiving the digital image and the information comprises:
- receiving, by the in-store server from the backend server via a wide area connection, (i) the digital image depicting the customer, and (ii) the information associated with the account of the customer.

15. The computer-implemented method of claim 13, wherein receiving the information associated with the account of the customer comprises:
- receiving, by the in-store server from the backend server via the network connection, at least one of: a name of the customer, an address of the customer, a date of a past visit to the brick-and-mortar property, or a purchase history of the customer.

16. The computer-implemented method of claim 13, further comprising:
- receiving, by the in-store server from the backend server via the network connection, a purchase history for the customer in a location of the brick-and-mortar property associated with a hardware transmitter.

17. The computer-implemented method of claim 16, further comprising:
- displaying, by the computing device via the user interface, the purchase history for the customer.

18. The computer-implemented method of claim 13, further comprising:
- displaying, by the computing device via the user interface, a selection for more information.

* * * * *